United States Patent [15] 3,693,658
de Bruyne et al. [45] Sept. 26, 1972

[54] PNEUMATIC PROGRAM READER

[72] Inventors: Norman A. de Bruyne, Princeton, N.J.; Geoffrey M. Brewin, Duxford, England

[73] Assignee: Techue Systems Incorporated

[22] Filed: April 13, 1970

[21] Appl. No.: 27,914

[52] U.S. Cl. ....................137/624.18
[51] Int. Cl. ....................G05b 19/44
[58] Field of Search ....137/624.18, 624.2; 91/36, 39; 235/201 FS; 74/124, 155

[56] References Cited

UNITED STATES PATENTS

| | | | |
|---|---|---|---|
| 3,283,782 | 11/1966 | Hague | 137/624.18 |
| 3,233,629 | 2/1966 | Beck | 137/624.18 |
| 794,918 | 7/1905 | Bisang | 74/128 |

*Primary Examiner*—Alan Cohan
*Attorney*—Nolte and Nolte

[57] ABSTRACT

The described invention resides in a pneumatic step-by-step perforated-tape reader comprising a rotatable drum for translating the tape on engagement with the drum, a pneumatic reading head for reading the tape when engaged with the drum, and indexing means for rotating the drum by indexed movements; the indexing means comprising escapement means for controlling rotation of the drum so that the drum undergoes the same degree of rotation in each indexed movement thereof, whereby when the tape is engaged with the drum, the tape can be translated to bring each of the succession of data locations on the tape, in turn, to the reading head to be read thereby. The invention includes mechanical features involved in the operation of the foregoing combination.

28 Claims, 2 Drawing Figures

PNEUMATIC PROGRAM READER

The present invention relates to a pneumatic tape reader.

Many complex automatic machines and computing devices perform their functions automatically according to a series of instructions prepared before-hand by a machine operator or programmer. This pre-prepared information can be in many forms but one of the most widely used methods of supplying information to a machine is to use a series of holes punched into paper or plastic cards or tape, the arrangements of the various holes containing the machines instructions in coded form. For a machine which requires a large number of instructions so that it may perform a complex task then this method of putting the instructions into the form of punched holes in a tape or card has considerable advantages over other methods as there is virtually no limit to the amount of information that can be supplied to the machine in this way. However when a machine's requirement for prepared information is small and the machine is required to repeat a series of instructions a large number of times then the existing methods of information supply in the form of holes or tape or cards are excessively complex and un-economic.

Briefly this invention relates to a device which uses a single program card which is wrapped around a grooved drum such that the length of the card is exactly equal to the circumference of the drum. Holes punched through the card at a succession of data locations thereon are detected by air flowing through the holes and supplied by a series of small tubes which are held against the curved surface of the program card after it has been wrapped around the drum. The presence of a hole in the card adjacent to one of these tubes containing air under pressure allows air to flow out of the tube and the pressure inside the tube to fall from its original value. The information contained in the punched card therefore can be conveyed to the machine in the form of variations in air pressure which are dependent on the presence or absence of holes punched through the program card as it passes the air tube.

It is an object of the invention to provide an indexing means for the drum of the reader, employing escapement means to control drum rotation to ensure the same degree of rotation in each indexed movement so that each of the succession of data locations on the tape, in turn, can be brought to the reading head to be read thereby.

It is also an object of the invention, to mount the reading head to underlie the drum so that the head is raised to contact the tape to be read, whereby the tape is not subjected to the weight of the head.

It is a still further object of the invention to provide means for holding a tape round substantially the entire periphery of the drum, whereby the tape can be read repetitively by repeated rotation of the drum.

Other objects and advantages of the invention will appear from the following description of an exemplary embodiment of the invention, taken in conjunction with the accompanying drawings in which.

Figure 2:
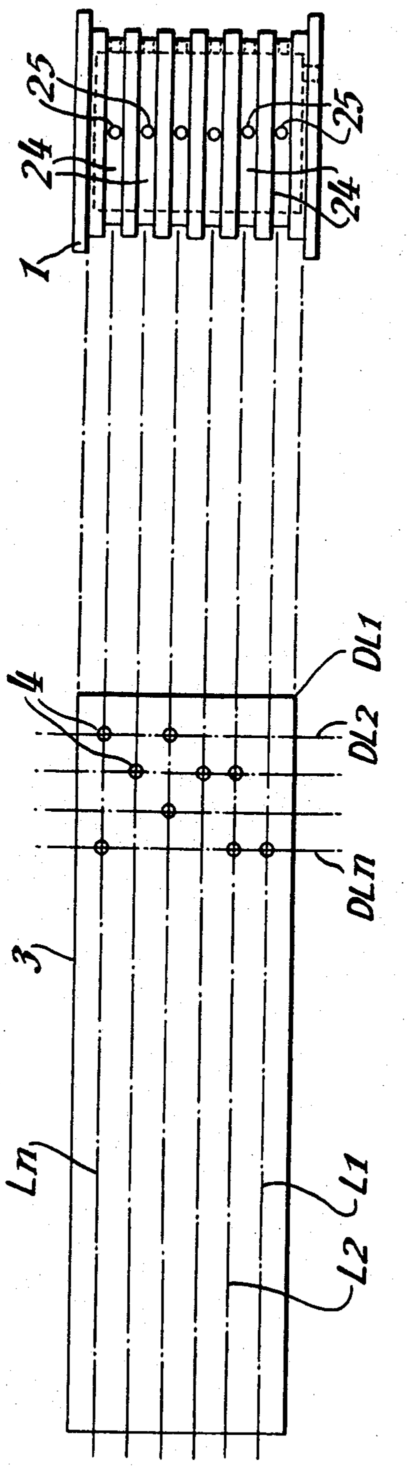
FIG. 2 is detail of FIG. 1, showing in plan view, a drum employed in the embodiment in relation to a tape for use with the embodiment.

Referring to the drawings, it may be seen that the embodiment comprises a drum 1. The drum bears a peripheral slot (not shown, but whose position is indicated at 2) in the axial direction of the drum, to receive end portions of a tape 3 (FIG. 2) so that the tape is held round substantially the entire periphery of the drum. The tape 3 has holes 4 punched therein; the holes representing data and being arranged at a succession of equally spaced data locations DL1, 2 — *n*, to lie on lines L1, 2 — *n*, passing in the length of the tape and equally spaced in the width of the tape. The drum is mounted on a shaft 5 on which it is free to rotate. Attached to the drum is a free wheel or one-way clutch 6 which allows the drum to be rotated in one direction only by the reciprocating action of a member 7 attached to a piston and cylinder assembly 8. This assembly consists of a piston 9 with a rolling diaphragm seal 10 which moves against the action of a spring 11 in the cylinder housing 12. When air is supplied under pressure to the rolling diaphragm to act against the piston head then the piston moves forward and compresses the spring. When the source of air pressure is removed, the spring returns the piston to its original rearward position. The one way clutch is so arranged that the forward motion of the piston together with its associated piston rod 13 does not drive the clutch nor, therefore, rotate the program carrying the drum. However, when the source of air pressure is removed from the piston head and the piston moves rearward under the influence of the spring, then the one way clutch is not free to move in this direction and the drum is then rotated a distance depending on the travel of the of the piston.

In order that the program carrying drum shall rotate an amount which is an exact fraction of the complete circumference of the drum (one-fortieth for example) an escapement means is incorporated. This consists of a ratchet wheel 14 having a number of teeth 15 equal to the number of required drum movements in the circumference, and engaging with this wheel is a pawl 16 urged into engagement with the ratchet wheel by a spring (not shown) and disengaged from the wheel by the action of a striker pin 17 carried on the piston rod, on the forward stroke of the piston. In being disengaged from the ratchet wheel, the pawl is moved just sufficiently to clear the pawl of the ratchet teeth. As the piston rod moves forward, the striker pin 17 engages the ratchet and disengages it from the toothed wheel. When the piston rod returns, the drum, (and with it the toothed wheel mounted on it) are rotated one step before the ratchet re-engages by the action of the spring bias thereon, with the ratchet wheel thereby preventing any further rotation of the drum.

Figure 1:
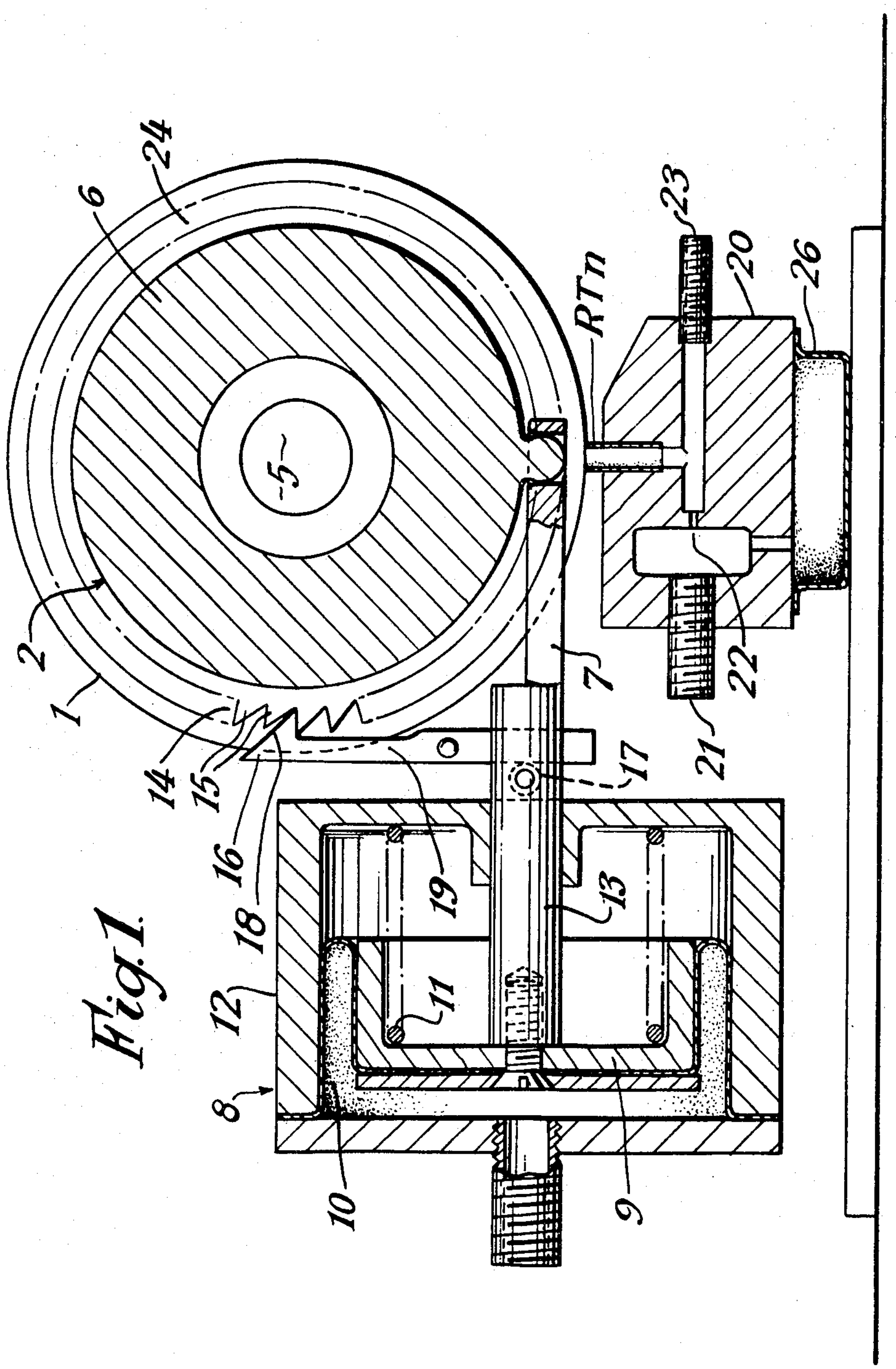
FIG. 1 is a diagrammatic part-sectional elevation of the embodiment.

It may be noted from FIG. 1 that the tooth 18 of the pawl is of the same dimensions and profile as the declivity between each two ratchet teeth and that when the pawl is engaged with the ratchet wheel, the arm 19 of the pawl lies vertically erect on a line parallel to the tangent to the ratchet tooth with which the pawl is engaged.

The presence of holes in the punched card is detected by a series of tubes one of which is seen at RTn, which are mounted in a reading head 20 and held against the surface of the program tape as it is rotated. The reading tubes are made of a plastic which has a low coefficient of friction when held against the program card. The number of reading tubes and hence the number of rows of holes in the program tape is not limited and can be as low as 1 and as high as 100 or more. Each reading tube is supplied by air under pressure from a manifold source 21 via a restricting orifice 22. The reading tube also connects directly to an output port 23. Because the reading tube is in close proximity to the program tape, then air lost from the reading tube is extremely low when there is no hole in the program tape. In this condition, the air flow through the restricting orifice is low and the pressure loss across the orifice is also low. The pressure in the output tube is therefore approximately equal to the pressure in the supply manifold.

When a hole in the program card is aligned with the reading tube then air can flow from the reading tube through the hole in the program card and thence to atmosphere via circumferential grooves 24 and venting holes 25 in the drum, immediately behind the hole in the program tape. In these circumstances, the air flow through the reading tube is considerably increased and the pressure drop across the restricting orifice is considerable. If the correct proportions for the reading tube in relation to the restricting orifice are used then the pressure drop across the restricting orifice in this condition can be higher than 90 percent of the pressure in the supply manifold. The pressure in the output tube can therefore be less than 10 percent of the supply manifold pressure.

The information holes punched into the program card are produced in a simple punching block which is so dimensioned as to ensure the consistent positioning of the rows of holes in relation to a reference such as the beginning of the program tape. This ensures that each time the drum stops after rotating for a fixed portion of its circumference, the holes on each row of the program accurately align with the row of reading tubes on the reading head. The reading tubes are held against the program by the action of air pressure inside a rubber diaphragm 26 mounted underneath the reading head. The area of this diaphragm is such that its upward force onto the program tape surface is always somewhat higher than the downward force caused by the pressure of air within the reading tubes acting on the program tape surface.

We claim:

1. A pneumatic tape reader for a tape, representing data by an arrangement of holes through the tape at a succession of equally spaced data locations thereon, the tape reader comprising:

A. a rotatable drum for translating the tape on engagement with the drum; vent means defined by the outer surface of the drum whereby the drum side of the tape is in fluid communication with atmosphere at all times, B. a pneumatic reading head for reading the tape when engaged with the drum, mounting means for moving said head into and from engagement with said drum, and C. indexing means for rotating the drum by indexed movements; the indexing means comprising escapement means for controlling rotation of the drum so that the drum undergoes the same degree of rotation in each indexed movement thereof, whereby when the tape is engaged with the drum, the tape can be translated to bring each of the succession of data locations on the tape, in turn, to the reading head to be read thereby, the arrangement being such that when the reading head registers with a hole through the tape it is placed in fluid communication with atmosphere through said vent means.

2. A tape reader according to claim 1, wherein the indexing means comprise transmission means for intermittently applying motive power to the drum to cause rotation thereof; and the escapement means comprise a ratchet wheel mounted to rotate with the drum, and a pawl pivoted to move in to and out of engagement with the ratchet wheel; and wherein the pawl is operatively connected with the transmission means so that the pawl is disengaged from the ratchet wheel when motive power is applied to the drum to commence an indexed movement thereof, and is reengaged with the drum to stop rotation thereof when the drum has been rotated by the amount of the index movement.

3. A tape reader according to claim 2, wherein the pawl is mounted so that when the pawl is engaged with the ratchet wheel, the arm of the pawl lies substantially parallel to the tangent to the ratchet tooth the pawl is engaged with.

4. A tape reader according to claim 2, wherein the tooth of the pawl is of the same profile and dimensions as the declivity between each two ratchet teeth.

5. A tape reader according to claim 2, wherein the drum is mounted horizontally and the ratchet wheel is mounted to lie in vertical plane, and the pawl is mounted so that when engaged with the ratchet wheel, the arm of the pawl lies vertically erect.

6. A tape reader according to claim 2, wherein the pawl is arranged so that in being disengaged from the ratchet wheel, it is moved just sufficiently to clear the ratchet teeth.

7. A tape reader according to claim 2, wherein the transmission means comprise:

a free-wheel device mounted to rotate the drum when driven in one direction, and to free-wheel when driven in the opposite direction;

a reciprocating member operatively connected to said device to drive it in said one direction on movement of said member in one direction of reciprocation, and to free-wheel the device on movement of the member in the other direction of reciprocation; and means to cause reciprocation of the reciprocating member.

8. A tape reader according to claim 7, wherein the pawl is resiliently biassed into engagement with the ratchet wheel, and the reciprocating member comprises a striking pin to move the pawl out of engagement with the ratchet wheel on movement of said member in said other direction, and to permit return of the pawl under the resilient bias on movement of said member in said one direction.

9. A tape reader according to claim 7, wherein said means to cause reciprocation, comprise:

a fluid pressure cylinder unit, and a return compression spring mounted to act against the piston of the unit, whereby the reciprocating member is moved in said other direction of reciprocation under fluid pressure, and is moved in said one direction of receiprocation by the action of the return spring.

10. A tape reader according to claim 9, wherein the cylinder unit comprises a rolling diaphragm mounted to receive the fluid supply to the unit whereby the fluid pressure is caused to act on the piston by expansion of the diaphragm.

11. A pneumatic tape reader for a tape representing data by an arrangement of holes at a succession of data locations on the tape, the tape reader comprising:

A. a rotatable drum mounted horizontally, for translating the tape on engagement with the drum;
B. a pneumatic reading head for reading the tape when engaged with the drum, the reading head being mounted to underlie the drum so that it can be raised into contact with the tape, and lowered therefrom;
C. means for effecting the raising and lowering of the head; and
D. means for rotating the drum by indexed movements, whereby when the reading head is raised and the tape is engaged with the drum, the tape can be translated to bring each of the succession of data locations, in turn, to the reading head to be read thereby.

12. A pneumatic tape reader according to claim 11 wherein said means for raising and lowering the head,comprise a fluid-pressure diaphragm mounted so that admission of the pressure fluid to the diaphragm raises the reading head, and release of the pressure fluid from the diaphragm, lowers the reading head.

13. A tape reader according to claim 11, wherein the reading head comprises a jet having a removable tip by which the head makes contact with the tape.

14. A tape reader according to claim 11, wherein the reading head comprises a plurality of jets respectively having removable tips by which the head makes contact with the tape.

15. A tape reader according to claim 11, wherein the reading head comprises a jet having a tip formed of a plastics material, by which the head makes contact with the tape.

16. A tape reader according to claim 11, wherein the reading head comprises a plurality of jets respectively having tips formed of plastics material, by which the head makes contact with the tape.

17. A pneumatic tape reader for a tape representing data by an arrangement of holes at a succession of data locations on the tape, the tape reader comprising:

A. a rotatable drum having means thereon for holding the tape round substantially the entire periphery of the drum;
B. a pneumatic reading head for reading the tape when so held around the periphery of the drum; and
C. means for rotating the drum by indexed movements, whereby when the tape is so held around the periphery of the drum, the tape can be translated to bring each of the data locations in turn, to the reading head to be read thereby, and whereby the tape can be read out repetitively by repeated revolution of the drum.

18. A tape reader according to claim 17, wherein said means for holding the tape, comprises a slot formed in the periphery of the drum in the axial direction thereof, to receive end portions of the tape.

19. A tape reader according to claim 17, wherein the drum comprises:

a circumferential groove to receive air from passing through a hole from the reading head and permit the air to expand therein;
an aperture formed in the groove to conduct air therefrom to the interior of the drum, and
vent means in the drum for venting entering the drum interior from the groove, to atmosphere.

20. A tape reader according to claim 17, wherein the drum is mounted horizontally and the reading head is mounted to underlie the drum so that it can be raised into contact with the tape, and lowered therefrom.

21. A tape reader according to claim 17, wherein the indexing means comprise escapement means for controlling rotation of the drum so that the drum undergoes the same degree of rotation in each indexed movement.

22. A tape reader according to claim 11, wherein the indexing means comprise escapement means for controlling rotation of the drum so that the drum undergoes the same degree of rotation in each indexed movement.

23. A pneumatic tape reader for a tape representing data by an arrangement of holes at a succession of equally spaced data locations on the tape, the tape reader comprising:

A. a rotatable horizontally mounted drum having means thereon for holding the tape round substantially the entire periphery of the drum,
B. a pneumatic reading head for reading the tape when so held, the reading head being mounted to underlie the drum so that it can be raised into contact with the tape and lowered therefrom;
C. means for effecting the raising and lowering of the reading head; and
D. means for rotating the drum by indexed movements; the indexing means comprising escapement means for controlling rotation of the drum so that the drum undergoes the same degree of rotation in each indexed movement thereof, whereby when the reading head is raised and the tape is held round the periphery of the drum, the tape can be translated to bring each of a succession data locations on the tape, in turn, to the reading head to be read thereby.

24. A pneumatic tape reader for a tape representing data by an arrangement of holes at a succession of equally spaced data locations on the tape, in lines passing in the length of the tape and equally spaced in the width thereof, the tape reader comprising:

A. a rotatable horizontally mounted drum formed with a slot in the circumference passing in the axial direction of the drum to receive end portions of the tape whereby the tape can be held round substantially the entire periphery of the drum, and with a plurality of circumferential grooves to register respectively with the lines of holes in the tape when the latter is attached to the drum, so that air passing through a hole in the tape from the reading head is expanded in a groove; each groove comprising an aperture to pass the air to the drum interior, and the drum having a vent to vent the air to atmosphere;
B. a pneumatic reading head mounted on a fluid-pressure diaphragm to underlie the drum so that the head can be raised into contact with the tape when attached to the drum, by admitting pressure fluid to the diaphragm, and lowered therefrom by release of the pressure fluid from the diaphragm; and C. indexing means for rotating the drum by indexed movements, the indexing means comprising:

a freewheel device mounted to rotate the drum when driven in one direction, and to free-wheel when driven in the opposite direction;

a reciprocating member operatively connected to said device to drive it in said one direction on movement of said member in one direction of reciprocation, and to free wheel the device on movement of the member in the other direction of reciprocation;

means to cause reciprocation of said member, comprising a fluid-pressure cylinder unit having a rolling diaphragm and a return compression spring each mounted to act against the piston of the unit so that the reciprocating member is moved in said other direction of reciprocation under fluid pressure acting on the piston by expansion of the diaphragm, and is moved in said one direction of reciprocation by the action of the return spring; and escapement means to control rotation of the drum so that the drum undergoes an equal degree of rotation in each indexed movement, the escapement means comprising:

a ratchet wheel mounted in a vertical plane to rotate with the drum, a pawl pivoted to move into and out of engagement with the ratchet wheel, means for resiliently biassing the pawl into engagement with the ratchet wheel, and a striking pin mounted on said reciprocating member so that the pin engages with the pawl to disengage it from the ratchet wheel on movement of the reciprocating member in said other direction of reciprocation, and permits return of the pawl on movement of the reciprocating member in said one direction, to re-engage with the ratchet wheel to stop rotation of the drum when the drum has been rotated by the amount of the indexed movement;

whereby when the reading head is raised and the tape is attached to the drum, the drum can be rotated to bring each of the succession of data locations, in turn, to the reading head to be read thereby.

25. A tape reader according to claim 24, wherein the pawl is mounted so that when engaged with the ratchet wheel, the arm of the pawl lies substantially parallel to the tangent to the ratchet tooth the pawl is engaged with.

26. A tape reader according to claim 24, wherein the pawl is mounted so that when engaged with the ratchet wheel, the arm of the pawl lies vertically erect.

27. A tape reader according to claim 24, wherein the tooth of the pawl is of the same profile and dimensions as the declivity between each two ratchet teeth.

28. A tape reader according to claim 24, wherein the pawl is arranged so that in being disengaged from the ratchet wheel, it is moved just sufficiently to disengage from the ratchet wheel.

* * * * *